April 1, 1958  M. GAUL  2,828,959
SPRING SHACKLES
Filed Feb. 25, 1953

INVENTOR.
Max Gaul.
BY
Harness, Dickey & Pierce
ATTORNEYS.

United States Patent Office 2,828,959
Patented Apr. 1, 1958

2,828,959

SPRING SHACKLES

Max Gaul, Eppstein, Taunus, Germany, assignor to Hans Sickinger, Providence, R. I.

Application February 25, 1953, Serial No. 338,828

1 Claim. (Cl. 267—54)

This invention relates to spring shackles used for vehicles, in particular for motor vehicles, and is based on the principle of thread bearings, by which the bearing bolt is designed as a thread bolt and the bearing shell as a thread bush.

It is common knowledge that such thread bearings are being widely used in various fields of engineering, preferably in automotive engineering, the special advantage of such thread bearings becoming obvious in such cases where the bearing is not stationary and is subjected, in addition to the usual radial stress, also to considerable axial stress. The latter stress will be entirely absorbed and will not render necessary the presence of any special limitation or limit stops to prevent displacement of the two bearing elements. Consequently, there will be no rattling of the spring shackles during operation. As regards the radial stresses, however, these thread bearings do not offer similar advantages, as compared to the customary plain bearings.

It is further known that such thread bearings may be improved in such a manner that the bush containing the bearing thread is externally provided with a truncated thread of small depth but of the same pitch as that of the bearing thread. Thereby the thread bush may be simultaneously screwed into the spring eye, or spring bracket, and onto the thread bolt, since the flat thread acts like a tap cutting a thread into the spring eye. Experience has shown that in this manner the thread bush will be firmly embedded within its enclosure, being unable to work loose under ordinary stress during operation.

In contrast to the known system, the present invention possesses the advantages of lower costs of manufacture and easier assembly in the surrounding parts, in addition to providing improved adaptability of one shackle element to the other, so that the formerly required care in the manufacture of these parts may be somewhat slackened.

The drawings show a preferred embodiment of the present invention.

Figure 1:
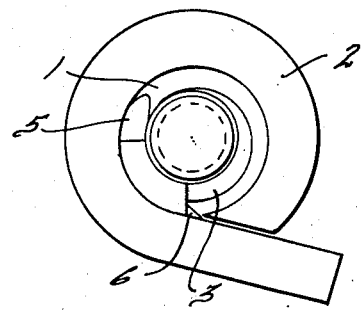
Figure 1 is a lateral view.
Figure 2:
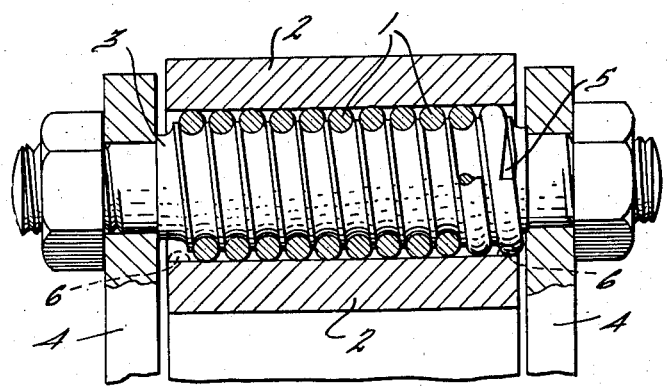
Figure 2 is a cross-sectional view of the invention, further showing the ends of the thread bolt together with the corresponding nuts in elevation.

Contrary to the known system, the thread bush is, in the present invention, replaced by a helical spring 1, the various coils or windings of which may be spaced at little or no distance. Such a spring is generally known to be wound without effort into a hollow space or cavity if the diameter of spring even slightly exceeds that of the cavity and if the rotary winding motion is effected contrary to the direction of coil of the said spring. In this manner the spring will be seated with unusual firmness in the surrounding part, for instance in the spring eye 2, particularly if the spring is subsequently turned back a little, i. e., contrary to the direction of coil. In this fashion there will be no subsequent loosening or dislocation among the shackle elements, even under high and varying stresses as occur for instance in the operation of motor vehicles, and even if lubricants have entered among the shackle elements. In the present case, the spring 1 has the function of the former thread bush; merely a thread bolt 3 will now be required as a second element, whose thread profile (in the drawings illustrated as a round thread) may be adapted to the cross-section of the wire of spring 1. The section may however just as well be triangular, square, rectangular or trapezoidal. The question as to which of these sections merits preference, will be subject to ruling conditions in conjunction with the effects desired of the spring shackle. The two thread bolts forming part of a complete shackle are firmly connected at their respective ends in the usual manner by means of butt straps 4.

When mounting the spring 1, for instance in a spring eye 2, it is necessary to screw the spring into the bore in a sense contrary to the direction of coil. To this end, a tool in the nature of a bit brace, together with a screw driver, may be employed to advantage as an auxiliary means. The screw driver will be inserted in the notch 5 provided near the end of the spring. The spring 1 may be secured in its ultimate position by cutting in either opening of the spring eye 2 a limit stop 6 against which the spring ends may be brought to rest, thus being protected against any displacement.

A notable advantage of all threaded spring shackles is their practical noiselessness, preferably in an axial respect. In the present invention the absence of noise will be entire, even in respect of a radial direction, if both end windings of the spring are bent slightly inwards, so that they will rest lightly upon the thread bolt 3 and will continue to do so even when the parts of the shackle are wearing out as a result of excessive use.

During operation, should the thread bolt 3 move radially against the helical spring 1, it will have to overcome the increasing pressure of the bent-in spring ends before it can come into contact with the spring 1. Owing to this obstacle, the impact of the two shackle elements will naturally not be accompanied by any noise, as would inevitably be the case without the above-mentioned provision.

Since various wire gages may be used for the manufacture of a helical spring 1, it will be possible to suit such different requirements as may be determinable by the diameter of wire. In addition to that, the pressure exercised by the spring upon the walls of the bore may be largely varied by elastically reducing the diameter of the spring when introducing same into the hole. A helical spring of 2.72" length and eleven windings, with a diameter of 0.976" and a wire gage of 0.18" which is inserted into a spring eye of 0.970" diameter will exercise a force of resistance of about 660 pounds, when forcibly extracted by means of the screwed-in thread bolt. The same spring screwed however into a spring bracket of 0.945" bore will, under otherwise equal testing conditions, approximate a resistance of 3,300 pounds. In both cases, lubricants are assumed to be present between the respective bearing faces.

The adhesive power existing between helical spring 1 and spring eye 2 or any other seat, respectively, may be increased in a simple manner, if required even to the point of inseparability, if the spring, prior to being inserted, is given a superficial coat of a special cement which possesses the property of chemically combining, through the action of oxidation of the steel, the two parts 1 and 2. Such cements are known to exist, as is also the phenomenon of adhesive oxidizing. For example, the inner face of spring eye 2 may be coated, after removal of grease, with aqua regia, diluted 1:3, which results in a superficial oxidation. The same applies also to helical spring 1 if this is rolled on a surface moistened with aqua regia, so that oxidation takes place on the narrow contact surfaces of the spring. Before the oxidation films have been fully dried, the spring is mounted in a surrounding eye and allowed to dry completely. The application and utilization of known procedures in the present invention with a view to achieving its object, offers another notable advantage, in that through the application of the said cement the tolerance between the external spring diameter and the bore hole may be kept much lower than was assumed above, as a result of which the spring 1 may be wound into the spring eye with considerably less effort.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In a shackle for a spring eye or the like having a substantially smooth inner surface, a helical spring disposed within said eye, said spring having an unstressed outer diameter greater than the inner diameter of said eye, whereby said spring exerts substantial outward radial pressure on said eye to hold the spring and eye against relative axial movement, an oxidation-promoting cementing substance in contact with the engaging surfaces of said helical spring and eye, and a threaded bolt rotatably disposed within said spring, the relative dimensions of the spring inner diameter and the bolt outer diameter being such that said spring serves as a bearing for said bolt, the bolt and spring having opposing surfaces which prevent relative axial movement therebetween.

References Cited in the file of this patent
UNITED STATES PATENTS

| | | |
|---|---|---|
| 1,169,397 | Guerini | Jan. 25, 1916 |
| 1,746,981 | Anderson | Feb. 11, 1930 |
| 1,940,345 | Brownlee | Dec. 19, 1933 |
| 2,019,513 | Stevenson | Nov. 5, 1935 |
| 2,022,946 | Staempfli | Dec. 3, 1935 |